United States Patent
Nagasawa

(10) Patent No.: US 6,782,281 B1
(45) Date of Patent: Aug. 24, 2004

(54) FOLDING PORTABLE TELEPHONE APPARATUS

(75) Inventor: Naokazu Nagasawa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 532 days.

(21) Appl. No.: 09/706,080

(22) Filed: Nov. 3, 2000

(30) Foreign Application Priority Data

Nov. 5, 1999 (JP) .......................................... 11-316119

(51) Int. Cl.[7] .............................................. H04B 1/38
(52) U.S. Cl. .............................. 455/575.3; 455/550.1; 455/566; 455/348
(58) Field of Search ................................ 455/575, 550, 455/348, 566, 550.1, 575.1, 575.3; 348/14

(56) References Cited

U.S. PATENT DOCUMENTS 5,710,576 A * 1/1998 Nishiyama et al. ......... 455/348
5,896,575 A * 4/1999 Higginbotham et al. .... 455/566
6,069,648 A * 5/2000 Suso et al. ..................... 348/14

FOREIGN PATENT DOCUMENTS

| EP | 0 897 236 A2 | | 2/1999 | |
|----|----|----|----|----|
| EP | 0 923 215 A2 | | 6/1999 | |
| GB | 2 333 926 A | | 8/1999 | |
| JP | 10136064 A | * | 5/1998 | ............ H04M/1/00 |
| JP | 11-88948 | | 3/1999 | |
| JP | 11-137851 | * | 5/1999 | ............ H04M/1/00 |
| JP | 11346273 A | * | 12/1999 | .......... H04M/11/00 |

* cited by examiner

Primary Examiner—Edward F. Urban
Assistant Examiner—Lana Le
(74) Attorney, Agent, or Firm—Pearne & Gordon LLP

(57) ABSTRACT

First display (4) comprising a liquid crystal display is provided on the outer surface of the first case body (1). In the near proximity of the first display (4) are provided a call start button (5a), a call release button (5b), a clear button (6), and a so-called navigation key (7) comprising arrow keys for scrolling in four directions and a center key for selecting and determining target information. When the folding portable telephone apparatus according to the invention is used as a pocket game machine, the call start button (5a) is used as a so-called B button for a pocket game, the call release button (5b) as a so-called start (S) button, and the clear button as a so-called A button. On the inner surface of the first case body is provided the second display (8), on the side of which is provided an antenna (9) retractable slantwise.

3 Claims, 13 Drawing Sheets

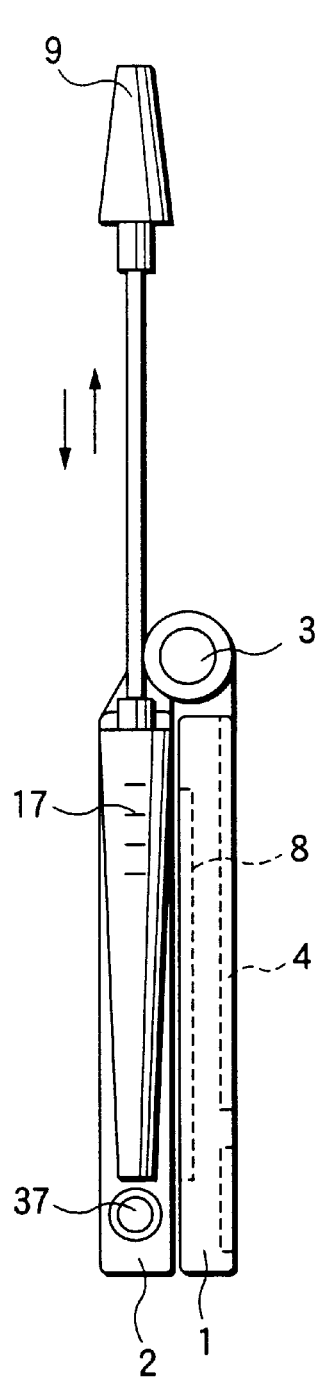
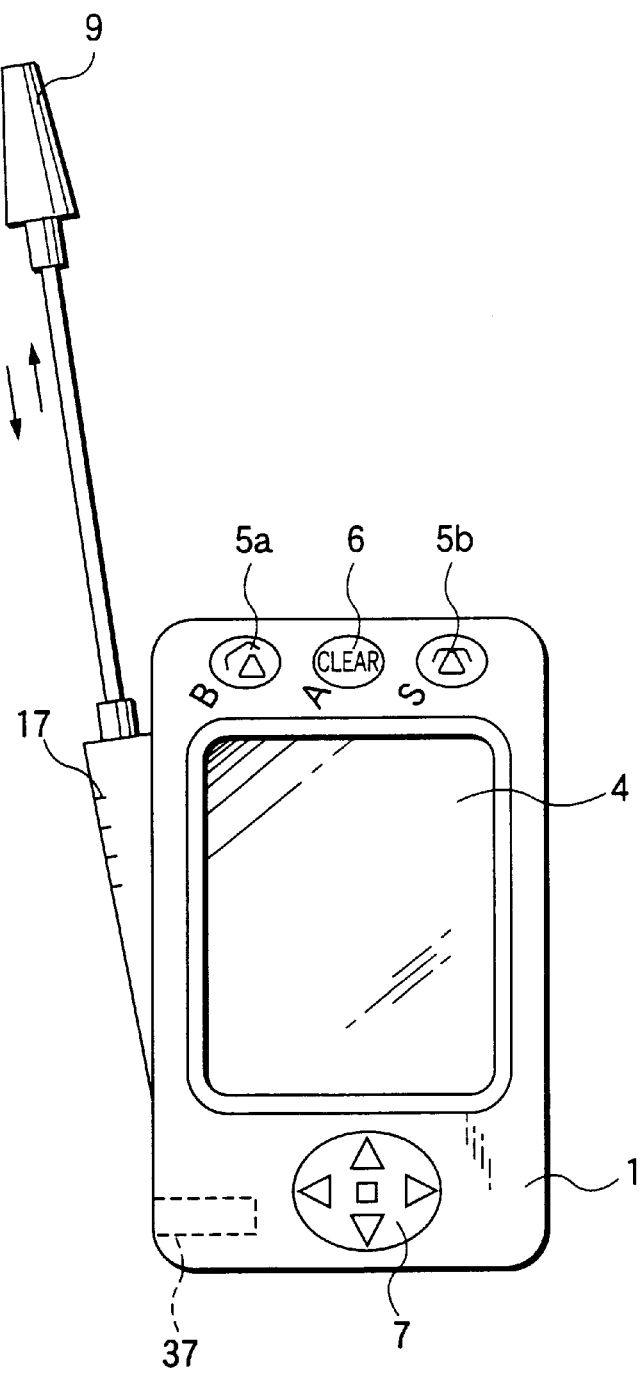

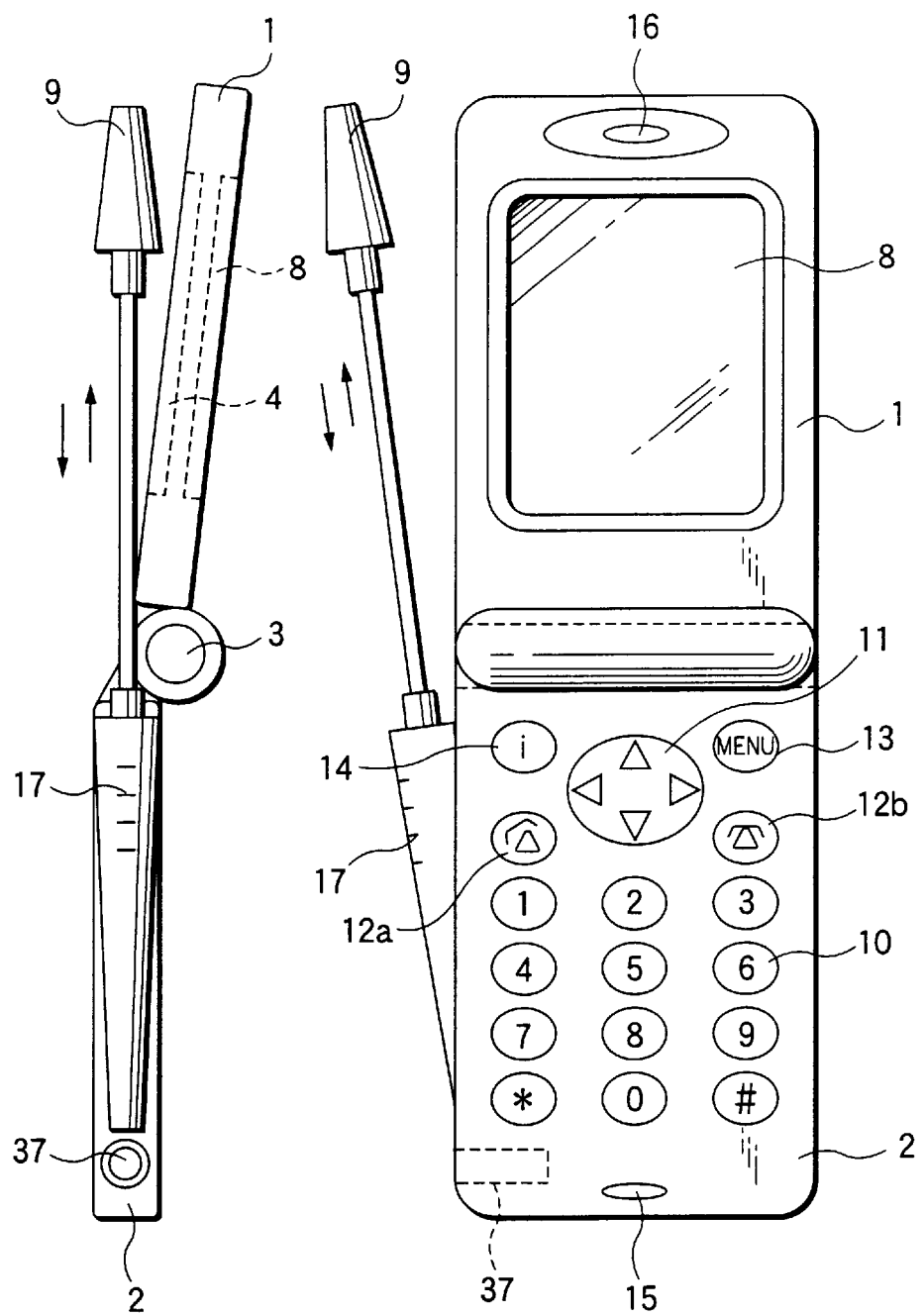

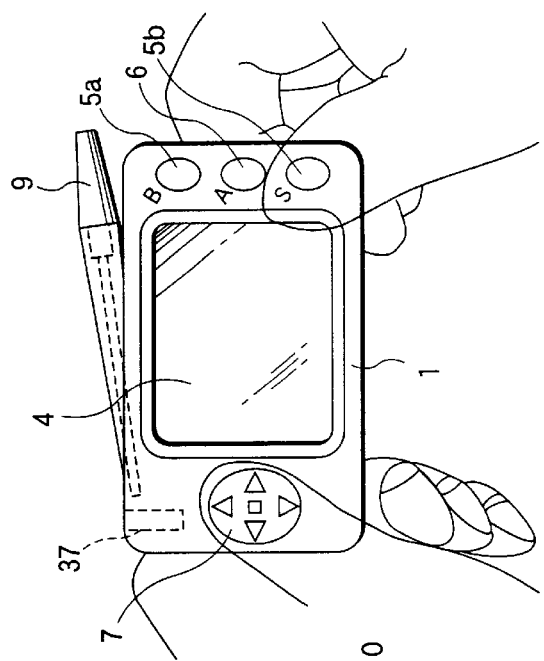
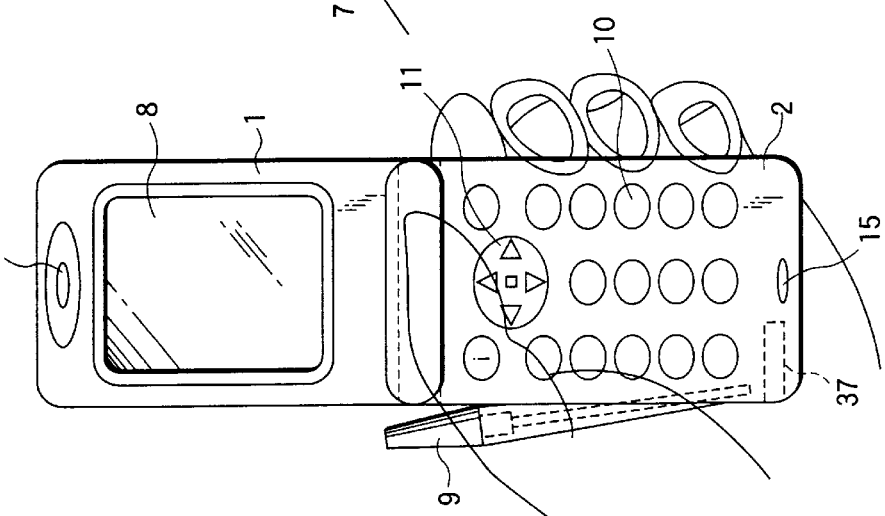
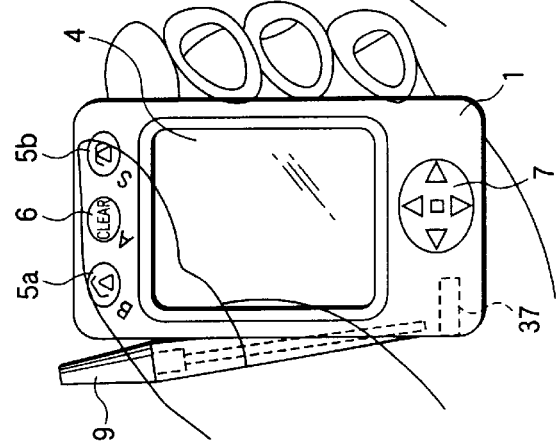

FIG.12A
FIG.12B
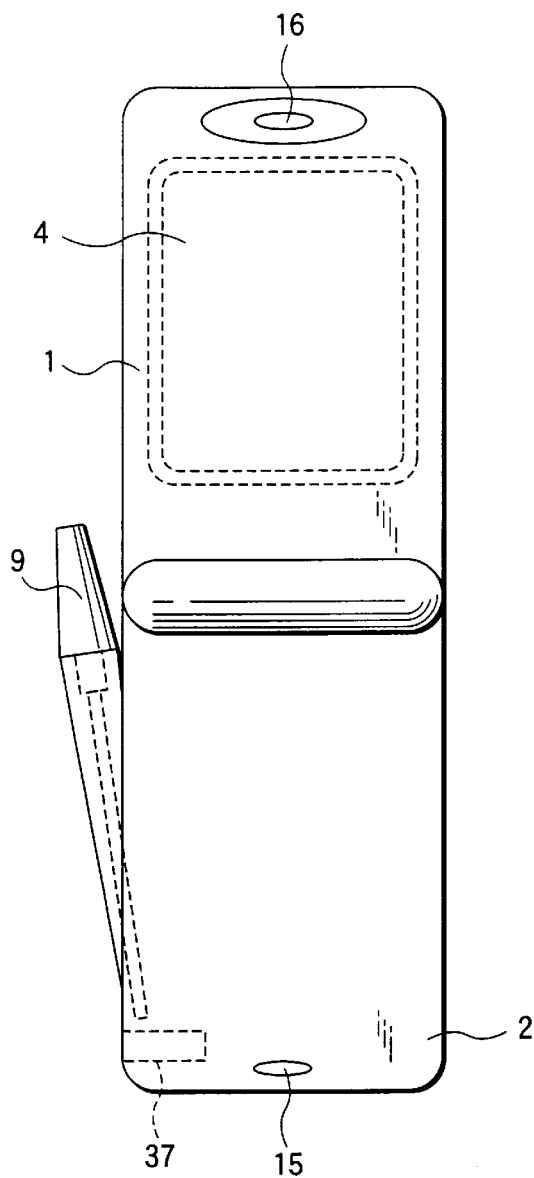
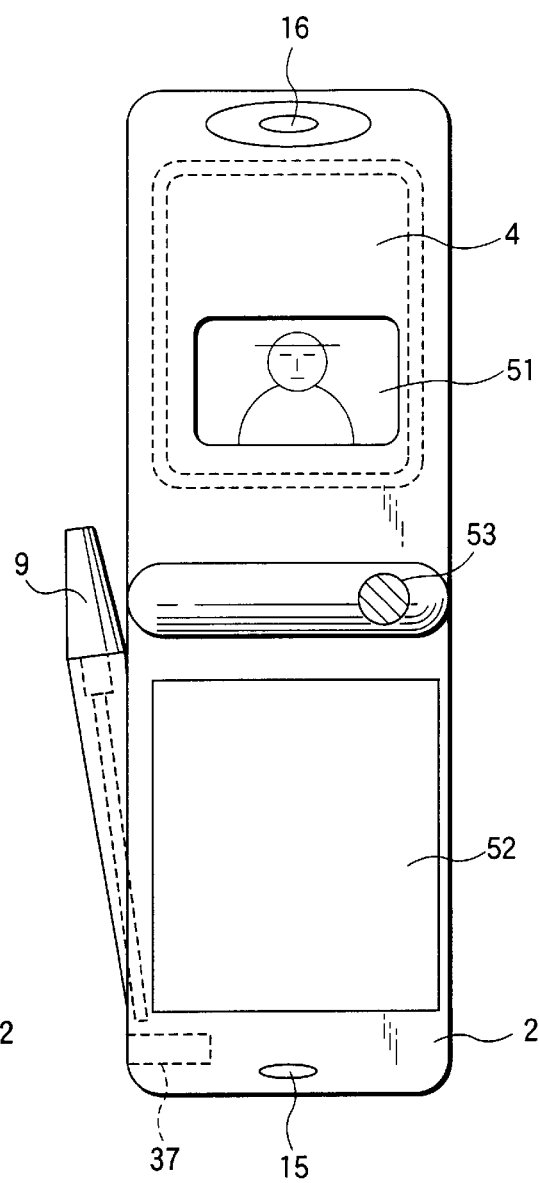

FIG.13A    FIG.13B    FIG.13C
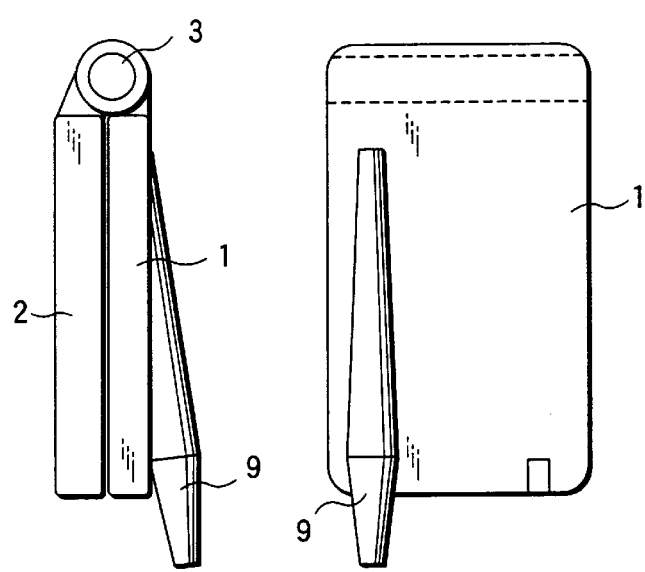
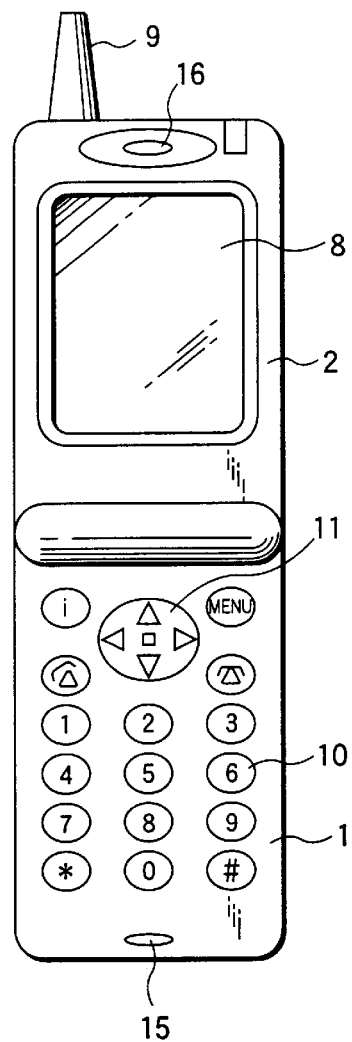

FOLDING PORTABLE TELEPHONE APPARATUS

BACKGROUND OF THE INVENTION

The present invention relates to a folding portable telephone apparatus having controller, display and operation means for a pocket game and equipped with a pocket game feature besides the radio communications feature.

Recently, a portable telephone apparatus equipped with a simple pocket game feature for the user to enjoy spare time waiting for an incoming time. However, in conventional portable telephone apparatus equipped with a pocket game feature, the pocket game feature was additionally provided as one of the optional features of the portable telephone apparatus. Such portable telephone apparatus had a configuration where operation means of the portable telephone apparatus such as a ten-digit keypad 10, a so-called scroll key 11 and display of the portable telephone apparatus such as a liquid crystal display 8 are used without modification. This configuration was not necessarily easy to handle when compared with a pocket game machine.

SUMMARY OF THE INVENTION

The present invention aims at providing folding portable telephone apparatus having the same operability and compact shape (form) and standard features as portable telephone apparatus.

The first aspect of the invention is folding portable telephone apparatus having a folding main body, an antenna, radio communications means, controller, storage means, folding/unfolding state detector, display, operation means, a transmitter and a receiver, wherein the antenna, the radio communications means, the controller, the storage means and the folding/unfolding state detector are embedded in the main body, that the display and the operation means are provided on the outer surface of the main body, and that the transmitter and the receiver are provided on the inner surface of the main body. Via this configuration, the user can play and display a pocket game by using the display and the operation means provided on the outer surface of the main body with the main body folded, and place a call by using the transmitter and the receiver provided on the inner surface of the main body with the main body folded.

The second aspect of the invention is folding portable telephone apparatus according to the first aspect of the invention having controller, display and operation means for a pocket game, wherein the apparatus is adapted to share the display for a pocket game with the display provided on the outer surface of the main body and to share the operation means for a pocket game with the operation means provided on the outer surface of the main body in order to associate operation control of a pocket game and operation control of portable telephone apparatus by way of controller on the folding portable telephone apparatus. Via this configuration, it is possible to provide folding portable telephone apparatus equipped with the operability of a pocket game machine.

The third aspect of the invention is folding portable telephone apparatus according to the second aspect of the invention, wherein a pocket game is automatically suspended on detecting a call incoming signal while the pocket game is in progress. Via this configuration, the user can suspend a pocket game without committing misoperation, annoyed by blinking of a call incoming indicator, ringing or vibration from a vibrator.

The fourth aspect of the invention is folding portable telephone apparatus according to the second aspect of the invention, wherein a pocket game is automatically suspended on detecting the main body being opened while the pocket game is in progress. Via this configuration, the user can suspend a pocket game when the user, noticing incoming of a call, just takes natural action of unfolding the main body.

The fifth aspect of the invention is folding portable telephone apparatus according to the second aspect of the invention, wherein, when the user operates an operation key for a pocket game to continue the pocket game while the apparatus has an incoming call and is rung, a predetermined message is automatically sent to the caller via radio communications means to terminate the call and the pocket game is continued. Via this configuration, the user can send a predetermined message to the caller and continue the pocket game.

The sixth aspect of the invention is folding portable telephone apparatus according to the second aspect of the invention, wherein the apparatus shares a call release key on the operation means provided on the outer surface of the main body with a start key for a pocket game and that, when the call release key is pressed for a shorter period than a predetermined period in the call incoming wait state, the apparatus assumes a push on the start key for a pocket game to make subsequent control. Via this configuration, the user can start a pocket game without having effects on essential features of portable telephone apparatus.

BRIEF DESCRIPTION OF THE DRAWINGS

FIG. 3A is a side view of folding portable telephone apparatus according to the first embodiment of the invention with the main body folded and the antenna stretched.

FIG. 3B is a front view of folding portable telephone apparatus according to the first embodiment of the invention with the main body folded and the antenna stretched.

FIG. 4A is a side view of folding portable telephone apparatus according to the first embodiment of the invention with the main body unfolded and the antenna stretched.

FIG. 4B is a front view of folding portable telephone apparatus according to the first embodiment of the invention with the main body unfolded and the antenna stretched.

FIG. 5A is an outer view of folding portable telephone apparatus according to the first embodiment of the invention while it is grasped.

FIG. 12A is a front view of folding portable telephone apparatus according to the fourth embodiment of the invention with the main body unfolded.

FIG. 12B is a front view of folding portable telephone apparatus according to the fifth embodiment of the invention with the main body unfolded.

FIG. 13A is a side view of conventional folding portable telephone apparatus with the main body folded.

FIG. 13B is a front view of conventional folding portable telephone apparatus with the main body folded.

FIG. 13C is a front view of conventional folding portable telephone apparatus with the main body unfolded.

DETAILED DESCRIPTION OF THE PREFERRED EMBODIMENTS

Embodiments of the invention will be explained with reference to FIGS. 1 through 12.

Figure 1A:
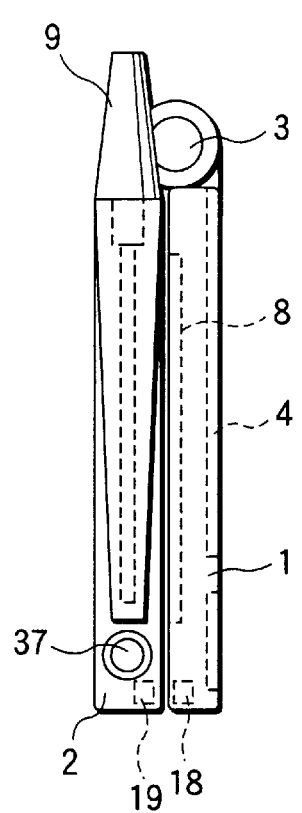
FIG. 1A is a side view of folding portable telephone apparatus according to the first embodiment of the invention with the main body folded.
Figure 1B:
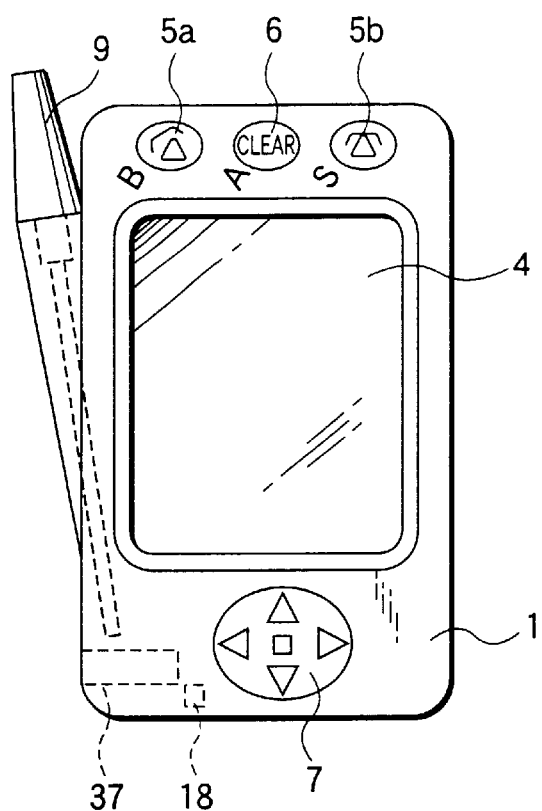
FIG. 1B is a front view of the folding portable telephone apparatus according to the first embodiment of the invention with the main body folded.
Figures 2A, 2B:
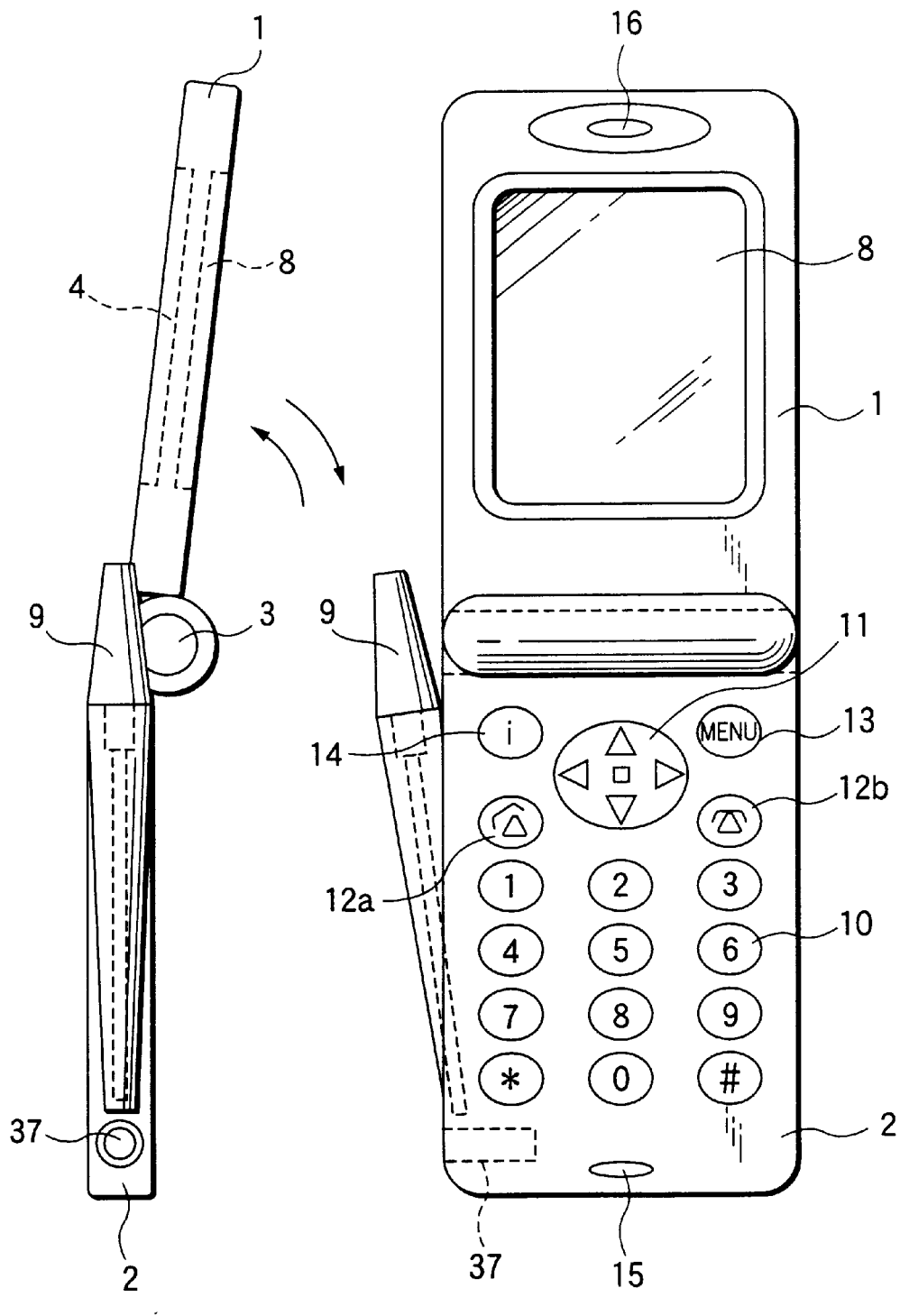
FIG. 2A is a side view of the folding portable telephone apparatus according to the first embodiment of the invention with the main body unfolded.
FIG. 2B is a front view of the folding portable telephone apparatus according to the first embodiment of the invention with the main body unfolded.

FIG. 1A is a side view of a folding portable telephone apparatus according to the first embodiment of the invention with the main body folded. FIG. 1B is a front view of the folding portable telephone apparatus according to the first embodiment of the invention with the main body folded. FIG. 2A is a side view of the folding portable telephone apparatus according to the first embodiment of the invention with the main body unfolded. FIG. 2B is a front view of the folding portable telephone apparatus according to the first embodiment of the invention with the main body unfolded.

Configuration of the folding portable telephone apparatus will be briefly explained with reference to FIG. 1 and FIG. 2. A first case body 1 and a second case body 2 are coupled via a hinge 3 so that the first case body 1 and the second case body 2 can be folded or unfolded via the hinge 3. As shown in FIG. 1B, first display 4 comprising a liquid crystal display is provided on the outer surface of the first case body 1. In the near proximity of the first display 4 are provided a call start button 5a, a call release button 5b, a clear button 6, and a so-called navigation key 7 comprising arrow keys for scrolling in four directions and a center key for selecting and determining target information. When the folding portable telephone apparatus according to the invention is used as a pocket game machine, the call start button 5a is used as a so-called B button for a pocket game, the call release button 5b as a so-called start (S) button, and the clear button as a so-called A button.

On the inner surface of the first case body is provided the second display 8, on the side of which is provided an antenna 9 retractable slantwise. A magnet 18 is embedded in the first case body 1 and a lead switch 19 is embedded in the second case body 2. When the main body is folded to bring the magnet 18 in close proximity to the lead switch 19, the lead switch is turned ON. When the main body is unfolded to place the magnet 18 apart from the lead switch 19, the lead switch is turned OFF. This allows detection of folding/ unfolding of the main body. An earphone jack 37 is provided in the lower section of the side equipped with the antenna.

FIG. 2A shows folding portable telephone apparatus with the first case body 1 unfolded upward. Unfolding the first case body 1 causes controller mentioned later to display text and graphics information on the second display 8 on the inner surface of the first case body. In the meantime, the first display 4 maintains the state assumed before the main body 1 was unfolded upward.

On the inner surface of the second case body 2 shown in FIG. 2B are provided a key operation area composed of a ten-digit keypad 10, a so-called navigation key 11 comprising arrow keys for scrolling in four directions and a center key for selecting and determining target information, a call start key 12a, a call release key 12b, a menu key 13, and a non-voice radio communications service start key 14 for receiving the non-voice radio communications service such as the i mode. A transmitter (microphone) 15 is provided in the lower section of the second case body 2, a receiver (speaker) 16 is provided in the upper section of the first case body 1.

FIG. 3A and FIG. 4A are side views of the folding portable telephone apparatus according to the first embodiment of the invention with the antenna stretched. FIG. 3B and FIG. 4B are front views of the folding portable telephone apparatus according to the first embodiment of the invention with the antenna stretched. The invention supports an antenna 9 retractably from bottom to top on the side of the second case body 2 so that it is possible to fold/unfold the first case body 1 irrespective of the direction of the antenna 9 and whether the antenna 9 is stretched or housed. A side groove 17 works as a non-slip when the body is grasped.

FIG. 5A, FIG. 5B and FIG. 5C are outer views of folding portable telephone apparatus according to the first embodiment of the invention while it is grasped. In the first embodiment of the invention, the user can hold the second case body 2 in his/her palm as shown in FIG. 5A and stretch the antenna as shown in FIG. 3. The user can also hold the second case body 2 in his/her palm as shown in FIG. 5B and stretch the antenna with the first case body 1 unfolded upward as shown in FIG. 4. In either case, the user can hold the second case body 2 in his/her palm as shown in FIG. 5A and FIG. 5B with the antenna 9 retractable from bottom to top on the side of the second case body 2, irrespective of whether the first case body is folded or unfolded.

FIG. 5C show folding portable telephone apparatus according to the first embodiment of the invention while it is operated sideways in both hands. This gives the user a similar operability as a pocket game machine. Up and down directions of the display screen in the pocket game, mode are controlled by controller for a pocket game 28 as mentioned later.

Figure 6:
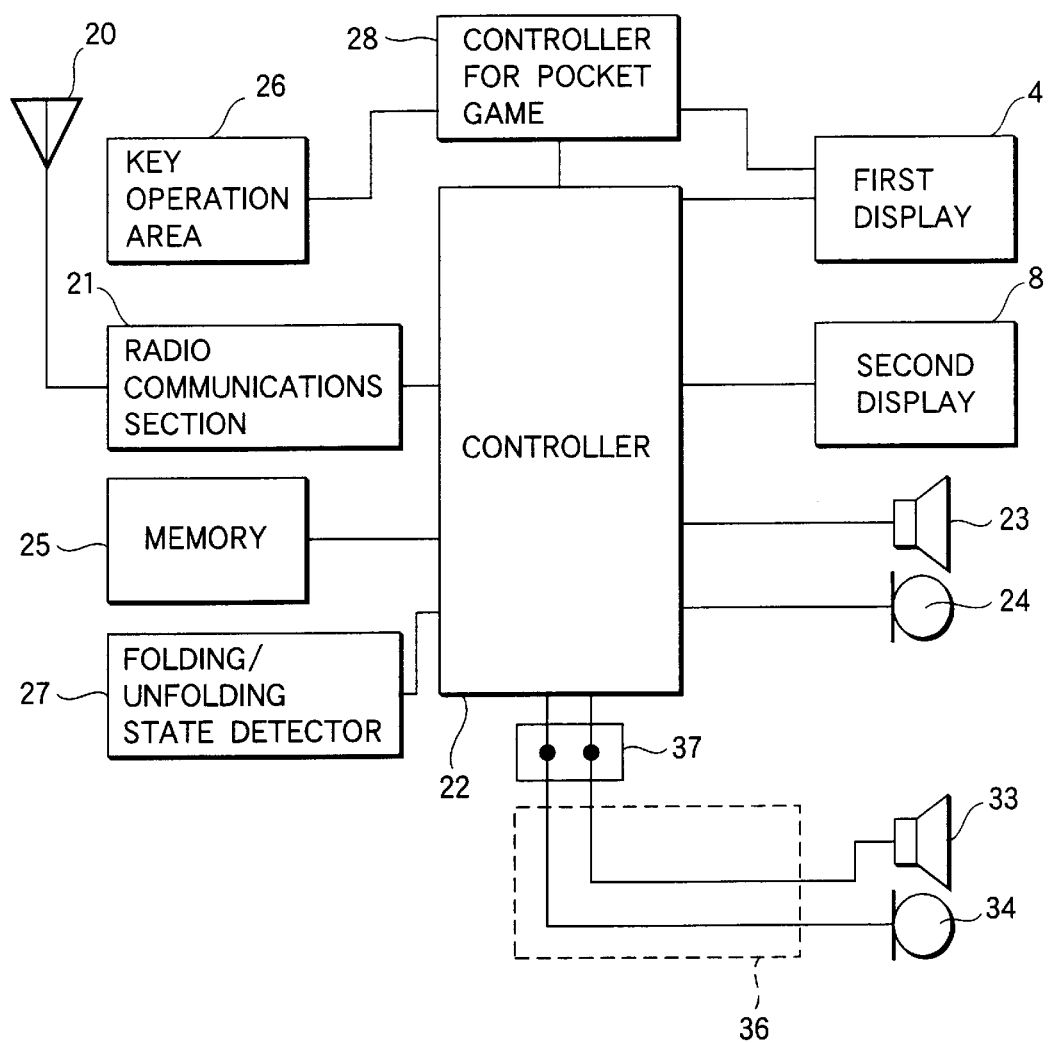
FIG. 6 is a block diagram of folding portable telephone apparatus according to the first embodiment of the invention.

FIG. 6 is a block diagram of a simple configuration of folding portable telephone apparatus according to an embodiment of the invention. In FIG. 6, radio waves coming from an antenna 20 are received by the receiver (not shown) of a radio communications section 21 and received information is transferred to a controller 22. The controller 22 displays the received information such as telephone numbers on the first display 4 on the outer surface of the main body or on the second display 8 on the inner surface of the main body.

The controller 22 converts received information to voice information and outputs the voice information from a receiver (speaker) 23. The transmitter (microphone) 24 transfers the user's voice to the controller 22 and transmits the information to the distant party via a transmitter (not shown) of the radio communications section 21 and the antenna 20. A key operation area 26 composed of a ten-digit keypad and a scroll key is adapted to input signals to the controller 22 via key operation and to store telephone number information, etc. in the memory 25 via-the controller 22.

Folding/unfolding state detector 27 on the main body detects the folding/unfolding state of the main body and communicates the result to the controller 22. The controller for a pocket game 28 comprises game programs and a CPU, and displays the pocket game playing state on the first display 4 on the outer surface of the first case body, via input operation from the key operation area 26 on the outer surface of the first case body.

The controller for a pocket game 28 suspends the operation of the game when the controller for a pocket game 28 receives a suspend instruction from the controller 22. An earphone microphone jack 37 is adapted to connect an earphone microphone 37 having an earphone 33 and a microphone 34 to the controller 22 so that the user can hear the sound of a pocket game with the main body folded and input a voice command.

Figure 7:
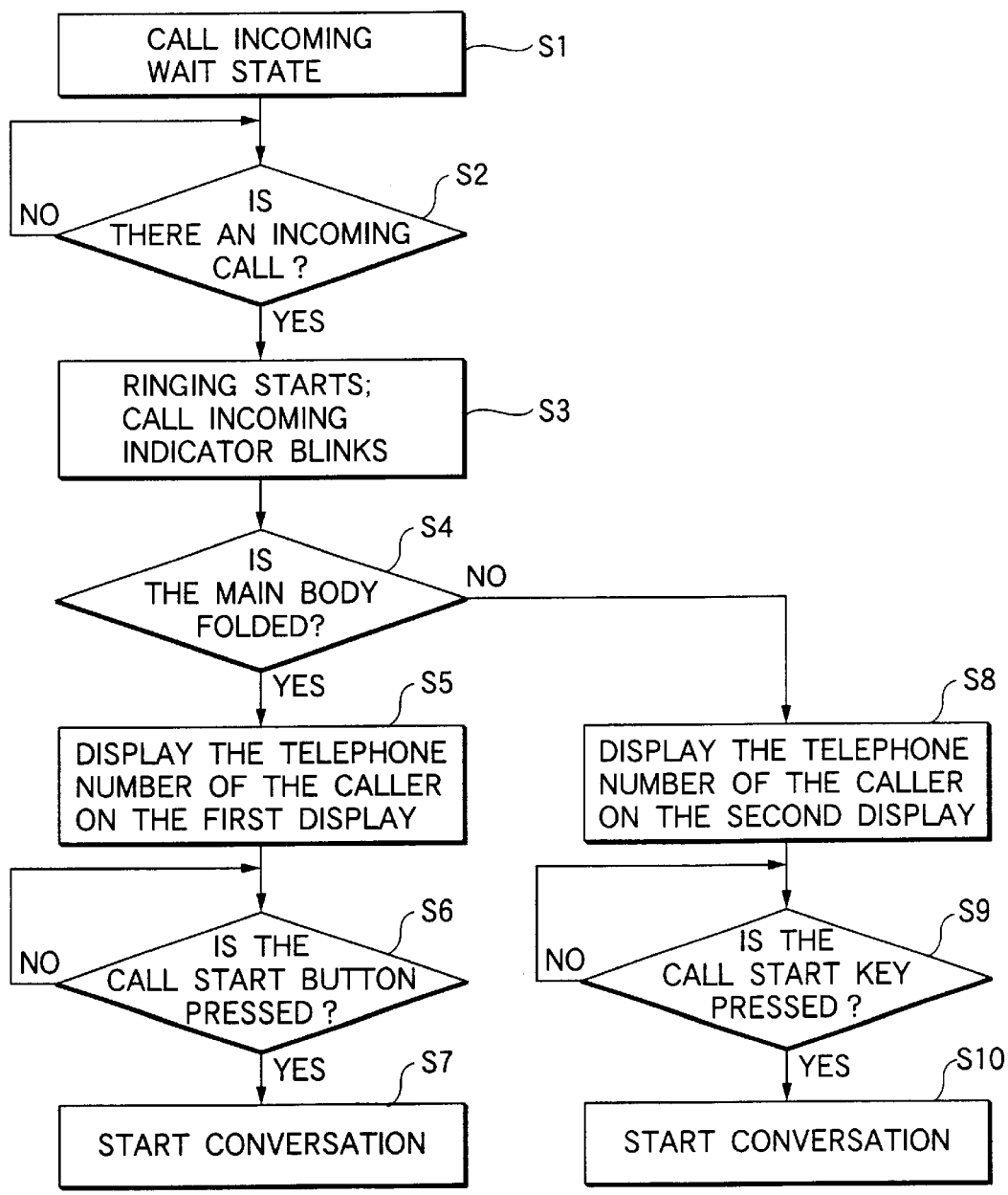
FIG. 7 is a flowchart showing the procedure for folding portable telephone apparatus according to the first aspect of the invention, from the call incoming wait state to start of conversation.

FIG. 7 is a flowchart showing the operation in which folding portable telephone apparatus according to the first aspect of the invention starts a call from the call incoming wait state irrespective of whether the main body is folded or unfolded. With the folding portable telephone apparatus powered on and in the call incoming wait state (step 1), when there is a incoming call (step 2), ringing starts or a call incoming indicator or a backlight on the display blinks (step 7).

The controller 22 obtains folding/unfolding state information from the cover opening/closing state detector 27 and determines whether the body is folded or unfolded (step 4). When the body is folded, the controller 22 displays caller information, i.e., the telephone number of the caller or caller's name on the first display 4 on the outer surface of the folded main body (step 5). When the user presses the call start button 5a (step 6), the user starts conversation using the earphone microphone 36 connected to the earphone jack 37 (step 7).

When the body is unfolded, caller information is displayed on the second display 8 on the inner surface of the main body (step 8). When a call start key 12a is pressed (step 9), the folding portable telephone apparatus starts a call by using the receiver 23 and the transmitter 24. Thus, according to the invention, the user can start conversation when the incoming call, irrespective of whether the main body is folded or unfolded.

Figure 8:
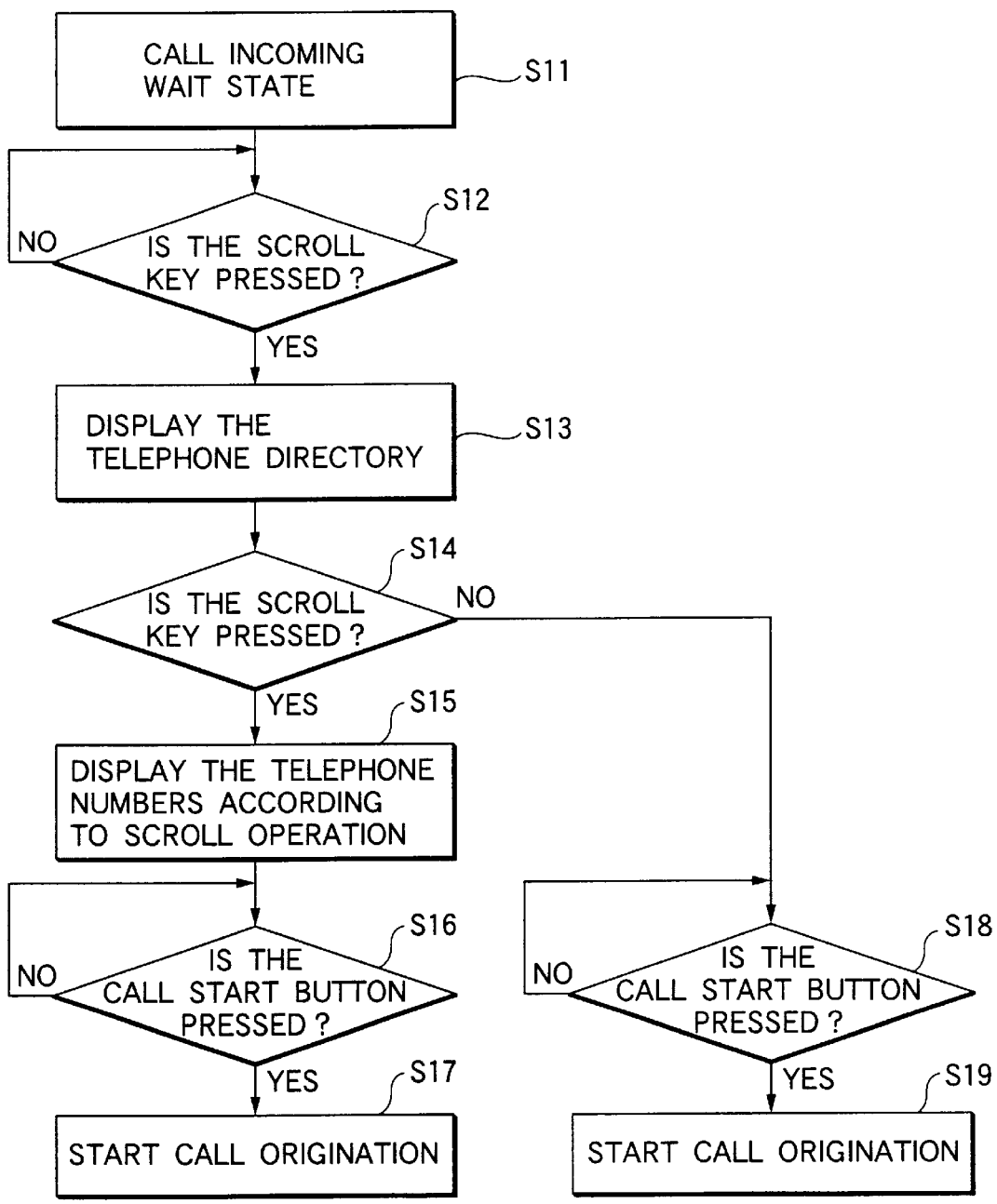
FIG. 8 is a flowchart showing the procedure for folding portable telephone apparatus according to the first aspect of the invention, from the call incoming wait state to start of call origination.

With the main body folded, the user cannot directly enter a telephone number using the ten-digit keypad 10. As shown in the flowchart of FIG. 8, the user can register telephone numbers as a telephone directory in a memory 25 and scroll through and display the telephone numbers by using the navigation key 7 which is a scroll key, then press the call start button 5a to start call origination.

Figure 9:
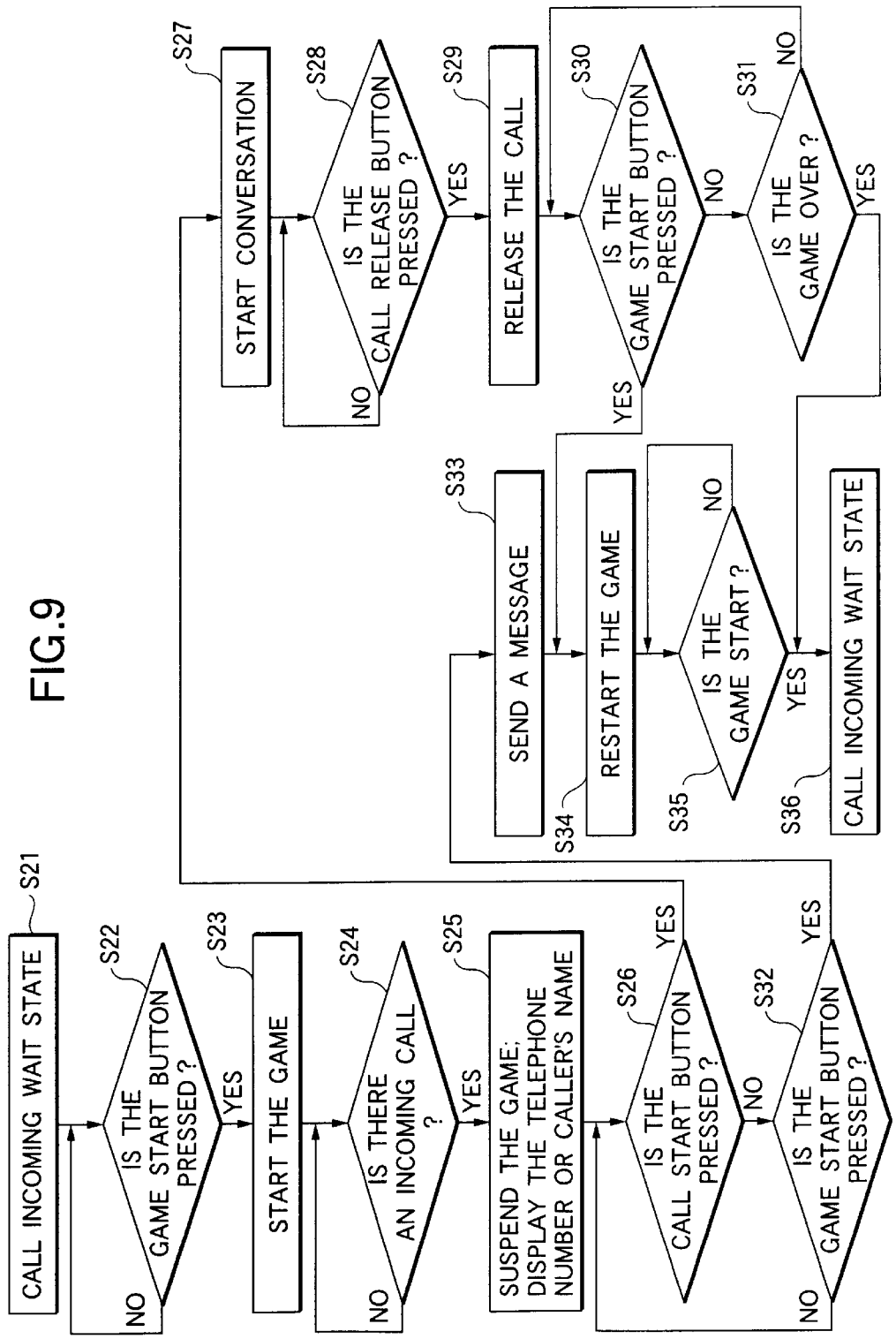
FIG. 9 is a flowchart showing the procedure for folding portable telephone apparatus according to the first aspect of the invention, in which a call terminates while a pocket game is in progress.

FIG. 9 is a flowchart showing the operation in which folding portable telephone apparatus according to the invention which can be used as typical portable telephone apparatus as mentioned earlier is used as a pocket game machine. When the folding portable telephone apparatus is powered on, the apparatus enters the call incoming wait state (step 21). When the start button 5a on the outer surface of the first case body (step 22), the controller for a pocket game 28 is activated and the pocket game starts (step 23). The user plays the game by using the A button 6, B button 5a and the navigation key 7 to play the game while hearing the sound of the pocket game via the earphone microphone provided on the side of the main body. The pocket game continues as long as no incoming call.

When there is an incoming call (step 24), the controller 22 issues a suspend instruction to the controller for a pocket game 28 and displays caller information, i.e., the telephone number of the caller or caller's name on the first display 4 which displayed the game in progress until then. The user checks the caller information. When the user presses the call start button 5a (step 26), the user starts conversation using the earphone microphone 36.

When the call release button 5b is pressed (step 28), the call is released (step 29). Because the pocket game is only suspended, when the start button 5b is pressed instantaneously for a short period (step 30), the pocket game restarts (step 34). When the game is over (step 35), the pocket game ends and the apparatus returns to the call incoming wait state again (step 36).

Even in case there is an incoming call and the caller information is displayed (step 25), when the call start button 5a is not pressed (step 26) but the start button for a pocket game 5b is pressed (step 32), a message stored in the memory 25 in advance, for example, a message "Sorry. The party at this number is not available now. Please use the automatic recording service." is sent (step 33) to release the call and restart the game (step 34). When the game is over (step 35), the pocket game ends and the apparatus returns to the call incoming wait state again (step 36).

Figure 10:
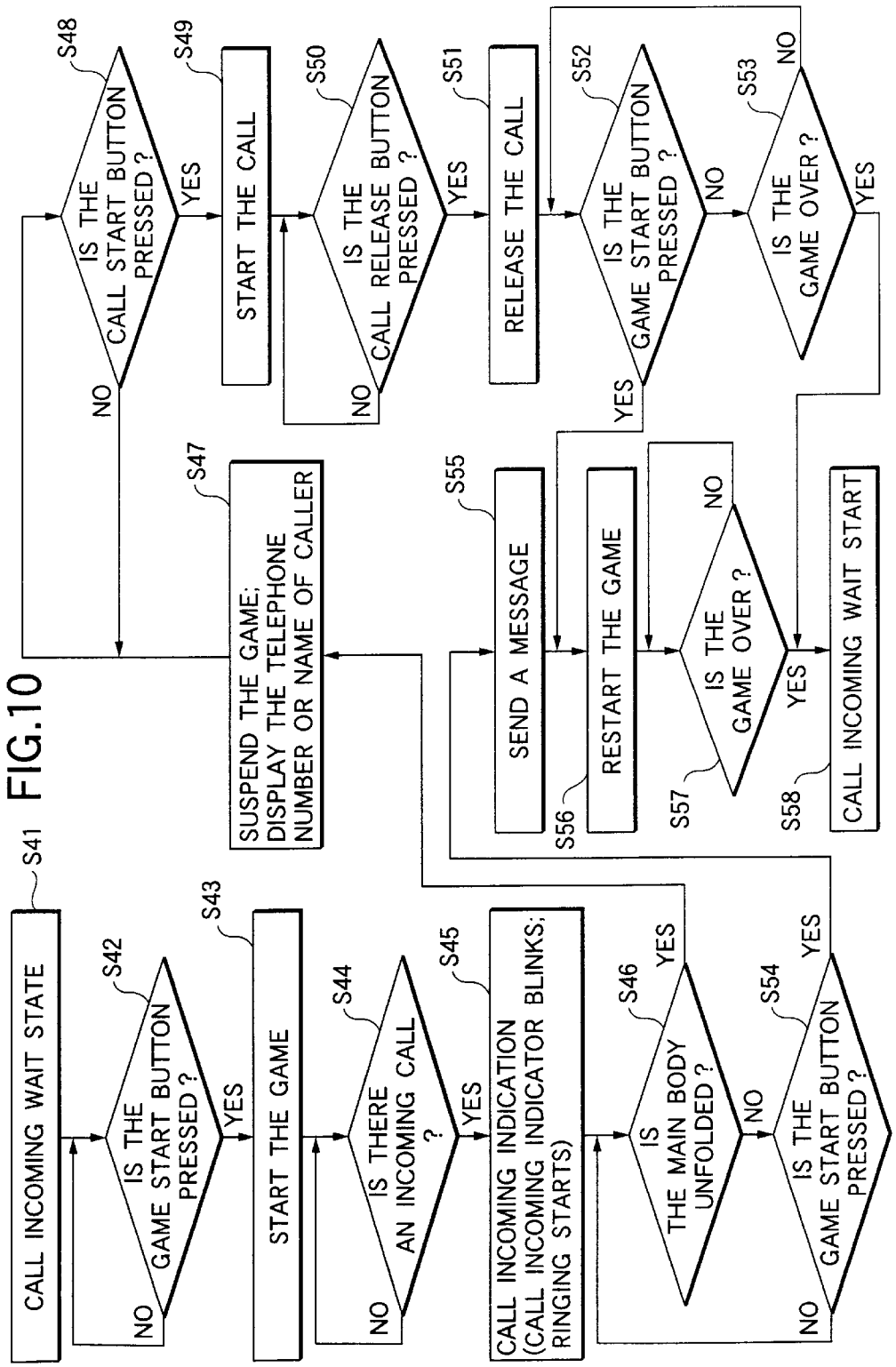
FIG. 10 is a flowchart showing the procedure for folding portable telephone apparatus according to the second aspect of the invention, in which a call terminates while a pocket game is in progress.

FIG. 10 is a flowchart showing the operation in which folding portable telephone apparatus according to the second embodiment of the invention is used as a pocket game machine. FIG. 10 differs from FIG. 9 in that, when an incoming call (step 44), the call incoming indicator or the backlight on the display blinks or ringing starts as a call incoming display, without forcibly suspending the pocket game as in step 25 in FIG. 9, and the user is asked for some operation (step 45).

When the user unfolds the main body at the right time in the proceeding of the pocket game, the folding/unfolding state detector 27 detects that the main body is open (step 46). The controller 22 issues a suspend instruction to the controller for a pocket game 28 to suspend the game and displays caller information on the second display 8 (step 47). When the user presses the call start key 12a (step 48), the user starts conversation using the transmitter 15 and the receiver 16 (step 49).

When the call release button 5b is pressed (step 50), the call is released. When the folding/unfolding state detector 27 detects that the main body is open, it may be assumed that the call start key 12a is pressed and step 48 may be omitted. When the folding/unfolding state detector 27 detects that the main body is folded, it may be assumed that the call release key 12b in step 50 is pressed.

Even in case the call is released in step 51 and the main body is folded, the pocket game is only suspended. When the start button 5b is pressed instantaneously for a short period (step 52), the pocket game restarts (step 56). When the game is over (step 57), the pocket game ends and the apparatus returns to the call incoming wait state again (step 58). The remaining procedures are omitted because they are the same as the flowchart in FIG. 9.

Figure 11A:
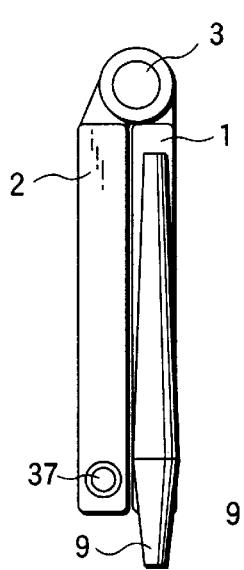
FIG. 11A is a side view of folding portable telephone apparatus according to the third embodiment of the invention with the main body folded.
Figure 11B:
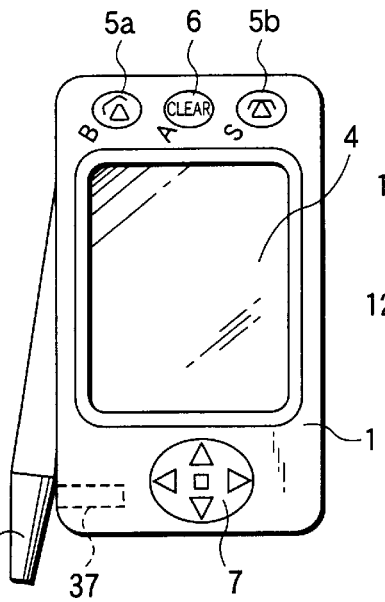
FIG. 11B is a front view of folding portable telephone apparatus according to the third embodiment of the invention with the main body folded.
Figure 11C:
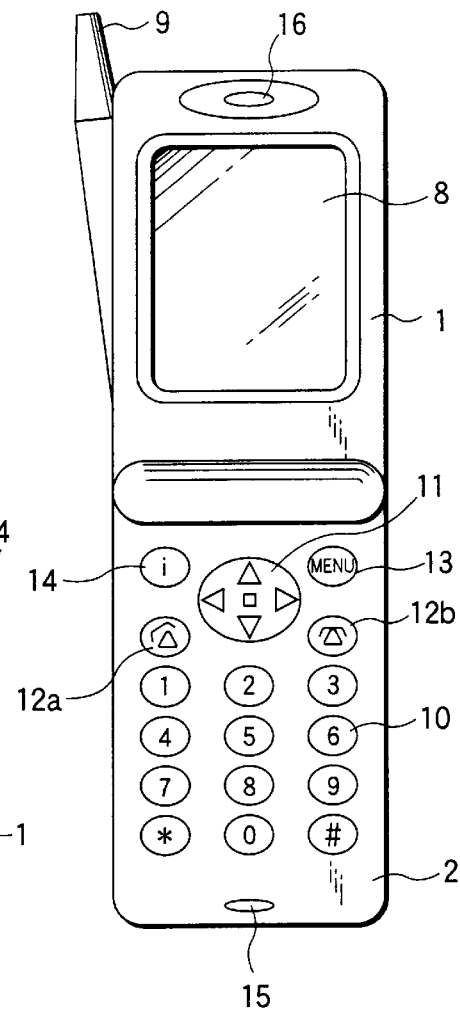
FIG. 11C is a front view of folding portable telephone apparatus according to the third embodiment of the invention with the main body unfolded.

FIG. 11 shows the third embodiment of the invention. The third embodiment differs from the first embodiment in that an antenna 9 is provided on the side of the first case body equipped with the first display 4 and the second display 8. FIG. 11A is a side view of folding portable telephone apparatus according to the third embodiment of the invention with the main body folded. FIG. 11B is a front view of folding portable telephone apparatus according to the third embodiment of the invention with the main body folded. FIG. 11C is a front view of folding portable telephone apparatus according to the third embodiment of the invention with the main body unfolded. Same reference numerals are used for the same sections as in the first embodiment of the invention.

In the third embodiment of the invention, an antenna 9 is provided retractably on the side of the first case body 1. This configuration has advantages that a large-sized first display 4 can be employed although antenna retracting operability is almost the same as in a conventional example in FIG. 13 and that the first display 4 can be used as display for a pocket game.

While in embodiments according to the invention as mentioned earlier, standard display and operation means for portable telephone apparatus are provided on the inner surface of the main body, only the transmitter 15 and the receiver 16 may be provided on the inner surface of the main body, as shown in the fourth embodiment of the invention in FIG. 12A. As shown in the fifth embodiment of the invention in FIG. 12B, a photo sticker 51 of the owner of the portable telephone apparatus may be affixed to the inner surface of the main body or a name sticker 52 bearing the address and name of the owner may be affixed. Video conference display may be provided where the photo sticker 51 is to be affixed in order to provide folding portable apparatus equipped with a small-sized TV camera 53 at the hinge.

As mentioned earlier, the first aspect of the invention is folding portable telephone apparatus having a folding main body, an antenna, radio communications means, controller, storage means, folding/unfolding state detector, display, operation means, a transmitter and a receiver, wherein the antenna, the radio communications means, the controller, the storage means and the folding/unfolding state detector are embedded in the main body, that the display and the operation means are provided on the outer surface of the main body, and that the transmitter and the receiver are provided on the inner surface of the main body. This configuration has an advantage that the user can play and display a pocket game by using the display and the operation means provided on the outer surface of the main body with the main body folded, and place a call by using the transmitter and the receiver provided on the inner surface of the main body with the main body folded.

The second aspect of the invention is folding portable telephone apparatus according to the first aspect of the invention having controller, display and operation means for a pocket game, wherein the apparatus is adapted to share the display for a pocket game with the display provided on the outer surface of the main body and to share the operation means for a pocket game with the operation means provided on the outer surface of the main body in order to associate operation control of a pocket game and operation control of portable telephone apparatus by way of controller on the folding portable telephone apparatus. This configuration has an advantage that it is possible to provide folding portable telephone apparatus equipped with the operability of a pocket game machine.

The third aspect of the invention is folding portable telephone apparatus according to the second aspect of the invention, wherein a pocket game is automatically suspended on detecting a call incoming signal while the pocket game is in progress. This configuration has an advantage that the user can suspend a pocket game without committing misoperation, annoyed by blinking of a call incoming indicator, ringing or vibration from a vibrator.

The fourth aspect of the invention is folding portable telephone apparatus according to the second aspect of the invention, wherein a pocket game is automatically suspended on detecting the main body being opened while the pocket game is in progress. This configuration has an advantage that the user can suspend a pocket game when the user, noticing incoming of a call, just takes natural action of unfolding the mainbody.

The fifth aspect of the invention is folding portable telephone apparatus according to the second aspect of the invention, wherein, when the user operates an operation key for a pocket game to continue the pocket game while the apparatus has an incoming call and is rung, a predetermined message is automatically sent to the caller via radio communications means to terminate the call and the pocket game is continued. This configuration has an advantage that the user can send a predetermined message to the caller and continue the pocket game.

The sixth aspect of the invention is folding portable telephone apparatus according to the second aspect of the invention, wherein the apparatus shares a call release key on the operation means provided on the outer surface of the main body with a start key for a pocket game and that, when the call release key is pressed for a shorter period than a predetermined period in the call incoming wait state, the apparatus assumes a push on the start key for a pocket game to make subsequent control. This configuration has an advantage that the user can start a pocket game without having effects on essential features of portable telephone apparatus.

What is claimed is:

1. A folding portable telephone apparatus comprising:
   a folding main body;
   an antenna provided in the folding main body;
   a radio communicator provided in the folding main body;
   a telephone controller provided in the folding main body;
   a telephone display provided on the outer surface of the folding main body;
   an telephone operation section provided on the outer surface of the folding main body;
   a transmitter provided on the inner surface of the folding main body;
   a receiver provided on the inner surface of the folding main body;
   a game controller for controlling a pocket game;
   a game display for displaying the pocket game; and
   a game operation section for operating the pocket game,
   wherein the game display is shared with the telephone display, the game operation section is shared with the telephone operation section, operation control of the pocket game and operation control of portable telephone apparatus are associated by way of the game controller and the telephone controller;

further comprising a folding/unfolding state detector which detects the state of the main body folded/unfolded, wherein the pocket game is automatically suspended on detecting the main body being unfolded while the pocket game is in progress.

2. A folding portable telephone apparatus comprising:

a folding main body;

an antenna provided in the folding main body;

a radio communicator provided in the folding main body;

a telephone controller provided in the folding main body;

a telephone display provided on the outer surface of the folding main body;

an telephone operation section provided on the outer surface of the folding main body;

a transmitter provided on the inner surface of the folding main body;

a receiver provided on the inner surface of the folding main body;

a game controller for controlling a pocket game;

a game display for displaying the pocket game; and a game operation section for operating the pocket game, wherein the game display is shared with the telephone display, the game operation section is shared with the telephone operation section, operation control of the pocket game and operation control of portable telephone apparatus are associated by way of the game controller and the telephone controller;

wherein, when the operation section is operated to continue the pocket game while the apparatus has an incoming call and is rung, a predetermined message is automatically sent to the caller to release the call, and the pocket game is continued.

3. A folding portable telephone apparatus comprising:

a folding main body;

an antenna provided in the folding main body;

a radio communicator provided in the folding main body;

a telephone controller provided in the folding main body;

a telephone display provided on the outer surface of the folding main body;

an telephone operation section provided on the outer surface of the folding main body;

a transmitter provided on the inner surface of the folding main body;

a receiver provided on the inner surface of the folding main body;

a game controller for controlling a pocket game;

a game display for displaying the pocket game; and a game operation section for operating the pocket game, wherein the game display is shared with the telephone display, the game operation section is shared with the telephone operation section, operation control of the pocket game and operation control of portable telephone apparatus are associated by way of the game controller and the telephone controller;

wherein the telephone operation section includes a call release key, the game operation section includes a game start key, the call release key is shared with the game start key, wherein the pocket game is started when the call release key is pressed for a shorter period than a predetermined period in the call incoming wait state.

* * * * *